United States Patent [19]

Earl

[11] 4,444,159
[45] Apr. 24, 1984

[54] CALCIUM CARBIDE/WATER ACETYLENE GAS GENERATOR

[76] Inventor: Gregory K. Earl, 4924 Crescent St., Chevy Chase, Md. 20015

[21] Appl. No.: 393,483

[22] Filed: Jun. 29, 1982

[51] Int. Cl.³ .................. F02B 43/10; C10H 5/00
[52] U.S. Cl. .................................... 123/3; 48/4; 48/19; 48/37; 123/1 A
[58] Field of Search ............... 48/4, 19, 37, 2, 3 R, 48/3 A; 123/1 A, 3

[56] References Cited

U.S. PATENT DOCUMENTS

| | | | |
|---|---|---|---|
| 638,448 | 12/1899 | Dolan | 48/37 |
| 687,469 | 11/1901 | Worthley et al. | 48/2 |
| 3,664,134 | 5/1972 | Seitz | 123/1 A |
| 4,054,423 | 10/1977 | Blenman | 123/3 |

Primary Examiner—S. Leon Bashore, Jr.
Assistant Examiner—Karen M. Hastings
Attorney, Agent, or Firm—Sherman & Shalloway

[57] ABSTRACT

An acetylene gas generator is comprised of inner and outer nested chambers in which the inner chamber has a plurality of trays inserted therein, with a grid located above each tray. Water is provided to the inner chamber and is dispersed throughout the inner chamber by the grids to the trays containing calcium carbide or like material. Space between the inner and outer chambers is used to provide liquid cooling of the inner chamber.

The generator can be used for a variety of purposes including the provision of acetylene for primary or auxiliary power for an internal combustion engine.

13 Claims, 4 Drawing Figures

CALCIUM CARBIDE/WATER ACETYLENE GAS GENERATOR

BACKGROUND OF THE INVENTION

1. Field of the Invention

This invention relates to an apparatus for generating acetylene gas in an exothermic reaction, indicated by the formula:

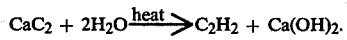

$$CaC_2 + 2H_2O \xrightarrow{heat} C_2H_2 + Ca(OH)_2.$$

The generation of acetylene gas provides a convenient fuel supply for a variety of purposes, including welding of metals, primary and secondary space heat, illumination and power for internal combustion engines.

2. Prior Art

The mixing of water with metallic carbides to produce acetylene gas is well known in the prior art. Prior to the use of electric power on automobiles, carriages commonly used carbide lamps for illumination. Typically, water was stored in a small chamber behind a reflector and was allowed to drip into a lower chamber containing calcium carbide ($CaC_2$). Gas emanating from the calcium carbide was permitted to escape through a burner nozzle located between a lens and reflector. While not quite up to the illumination quality of a modern quartz-iode headlamp, these early devices gave ample illumination, using an easily-stored fuel. Similarly, several apparatus have been developed which provide for the generation of acetylene gas within cooled chambers. In one device, represented by U.S. Pat. No. 535,944, acetylene generators are nested within tanks containing cooling water which absorb the heat set free by the exothermic reaction of calcium carbide.

The provision of grids for holding carbide material in acetylene generators is also known. For example, a device, represented by U.S. Pat. No. 638,448, uses a cage-like arrangement for containing carbide material within a chamber of a gas-generating device. It is also known to provide cloth material around carbide briquettes in order to disperse water about briquettes of calcium carbide. In that case, the carbide is allowed to bunch together, as the cloth material provides no support structure which would prevent such bunching together.

There have been proposals to utilize gas produced by water-carbide reactants in order to propel motor vehicles. For example, one device, proposed in U.S. Pat. No. 4,054,423, uses pressure regulation to control the flow of both gas and water in a generator for propelling a vehicle. It is also proposed that the assembly be used in combination with a liquid (gasoline) fuel supply. Especially in the case of motor vehicles, it is important to provide an output of acetylene gas which can be closely controlled in accordance with the required power consumption of the vehicle. For this reason, a rapid interdispersion of reactants is important. In the case of the carbide-water system, this means that water must be allowed to rapidly disperse throughout the carbide "charge" (that carbide which is to be potentially exposed to water). In order to obtain such dispersion, it is important that the water by evenly distributed to the charge and that the charge be supported in a manner such as to reduce the obstruction of water by successive layers of carbide.

Motor vehicles, particularly highway motor vehicles including trucks and cars, are characterized by their varying requirements for power. The criteria for selecting a power plant are based on the desire to provide ample power, thereby enhancing the power performance of the vehicle, while reducing waste of power to maximize the fuel efficiency performance of the vehicle. For maximum economy, there is an optimum power capability for obtaining a specified power output from an internal combustion engine. While the figure may vary, the optimum power output for typical fuel injected spark- and compression-ignition engines is obtained at between ¾ and full throttle applied at low engine speeds. This makes the use of a relatively low-powered power plant advantageous in terms of fuel economy. The minimum size of a power plant is determined primarily by three design criteria: maximum acceleration requirements; maximum speed; and ability to maintain speed in various adverse conditions such as in climbing hills. Of these criteria, the ability to accelerate and the ability to climb hills is usually a transient occurrence, i.e., not experienced for extended periods of driving. Maximum speed at cruise, on the other hand, can be required for considerable periods of time. In many cases, the maximum cruise speed criteria requires less engine power than the acceleration and hill climbing criteria. In other words, the engine is required to have more power than is necessary to maintain maximum cruise and therefore more power than is needed for its continuous operation. Since the increase of power capacity may result in a decrease in fuel economy, many vehicles have less economy than they would if their engines only were selected for their maximum cruise ability. Furthermore, the maximum speed for a vehicle may be substantially different from the anticipated average highway speed of the vehicle. For example, if it is anticipated that a vehicle will be cruising at 140 kilometers/hour in most conditions but it is desired that the vehicle be able to accelerate up to 200 kilometers, the economy at 140 kilometers may be compromised.

SUMMARY OF THE INVENTION

It is accordingly an object of the invention to provide an acetylene gas generator which has a high efficiency and which responds quickly to changes in the rate of water injection. It is a further object to provide an acetylene gas generator which evenly distributes water to calcium carbide within a gas-generating chamber. It is a further object of the invention to provide an acetylene gas generator which, due to interdispersion of water throughout a gas-generating chamber, provides rapid response without over-saturating the chamber with water, thus resulting in a residue end product which is relatively dry.

It is a further object of the invention to provide an acetylene gas generator which has trays for supporting calcium carbide which are convenient to handle and which increase the density of a charge of calcium carbide material without reducing fluid access to the charge. It is a further object to provide such a gas generator which has a means for dispersing water throughout the gas-generating chamber associated with the trays.

It is a further object of the invention to provide a gas generator which is compact with respect to the amount of acetylene it is capable of producing, is efficient in the production of acetylene gas, is quickly responsive to changes in water flow rates and leaves a minimum of moisture in the calcium hydroxide residue remaining after use. It is a further object to provide such a generator in association with a portable power supply.

It is a further object to provide an acetylene generator which is compact and which can be used in conjunction with an internal combustion engine. It is a further object to provide such a generator which can be used to provide a supplemental source of power for an internal combustion engine.

Accordingly, a fuel cell is provided which produces acetylene gas and is comprised of an inner housing and an outer housing. The inner and outer housings each have one opened side, with the inner housing being nested in the outer housing. The space between the inner and outer housings is sealed, providing a cooling chamber. Fixed to the inner housing are a plurality of brackets which provide horizontal support for a plurality of trays and grids. The trays provide support for calcium carbide material while the grids disperse and promote dispersion of water which is injected into the inner chamber. The water is injected through a series of water lines connected to a water pump, which may in turn be connected to one or more water tanks. The inner chamber functions as a gas-generating chamber. Gas is controlled by a regulator which normally detects the pressure of gas within the gas generating chamber and controls the water supply accordingly. In the preferred embodiment, the trays and grids in the inner chamber may be readily removed and replaced for ease of recharging the fuel cell. A cooling chamber allows a provision of a closed circuit cooling system, using a cooling system, using a cooling pump and radiator to provide necessary cooling for the fuel cell.

BRIEF DESCRIPTION OF THE DRAWINGS

FIG. 1b shows a gas-generating chamber which, as an inner chamber, is inserted into the outer chamber of FIG. 1a;

DETAILED DESCRIPTION OF THE PREFERRED EMBODIMENT

While the following description of the preferred embodiment refers to acetylene gas ($C_2H_2$) which is formed in the above-mentioned exothermic reaction of calcium carbide ($CaC_2$) with water, it is understood that the generator according to the invention can be used to generate gas from any solid and liquid combination which will produce a gas.

Figure 1A:
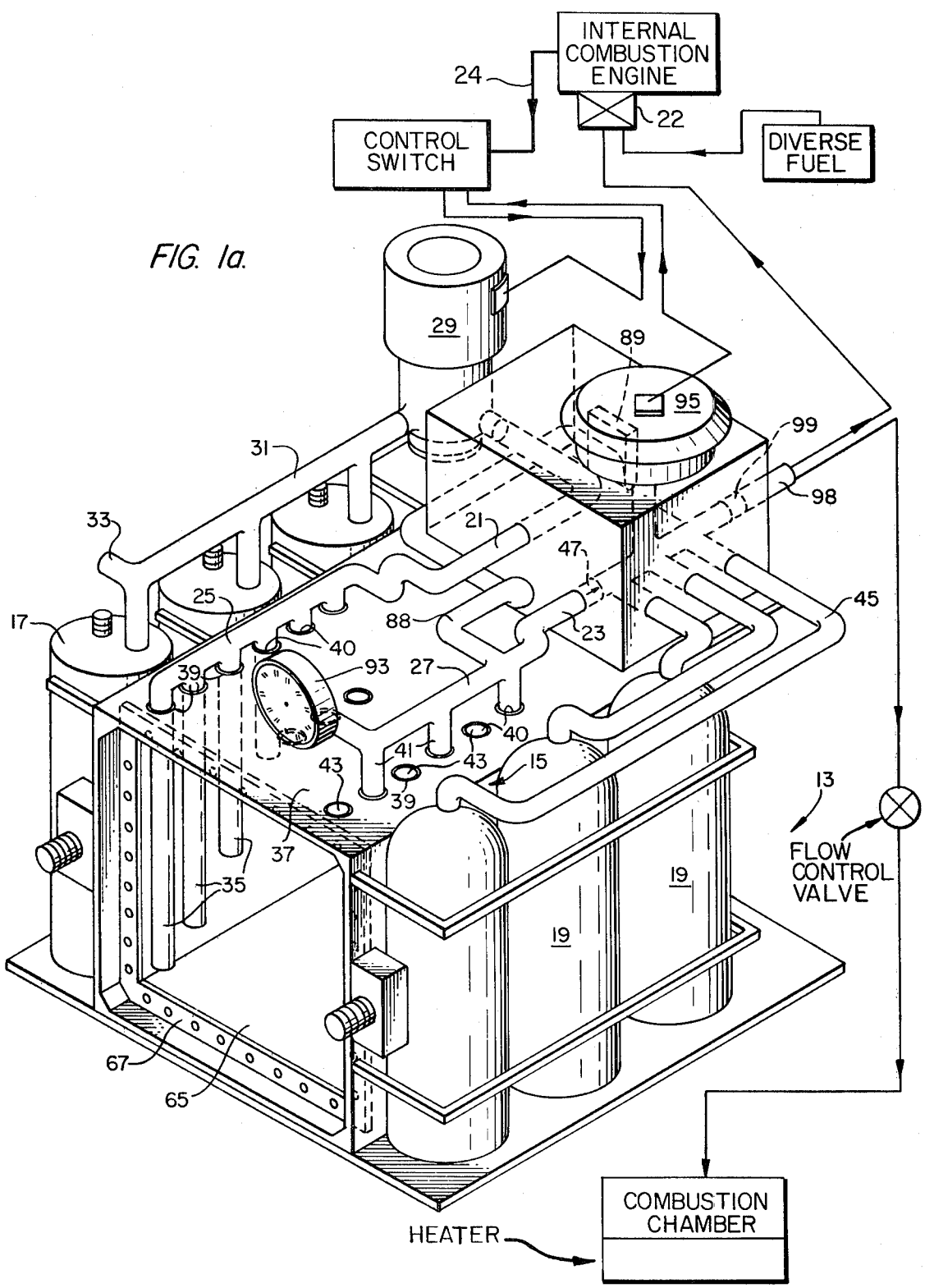
FIG. 1a shows an outer chamber for the gas generator according to the invention, along with water and gas supply and storage components.

Referring to FIG. 1a, the gas generator according to the present invention is provided as a box-like structure 13 in which an outer chamber 15 supports a plurality of water storage tanks 17 and gas storage tanks 19. A series of lines 21, 23 terminate in manifolds 25, 17. Line 21 is a water line and is connected to a water pump 29, which, in turn, is connected to water supply line 31. The water supply line 31 is, in turn, connected to tanks 17 which are water-storage tanks. The water supply line 31 also has an external inlet 33 which permits rapid refilling of all of the water supply tanks 17 through the water supply line 31. Manifold 25 is a water supply manifold which is connected to a plurality of water supply tubes 35. The water supply tubes 35 pass through the outer chamber 15 at a top portion 37 thereof. Seals 39 are provided at each of a plurality of apertures 40 on the top 37 of the outer chamber 15. The water supply tubes 35 may have different lengths. As will be described infra, this allows the water supply tubes 35 to extend, through the top 37 of the outer chamber 15, into the inner chamber 51 (see infra) to different depths.

Line 23 is a gas line, which is connected to manifold 27 which is a gas-collecting manifold. The gas collecting manifold 27 connects with gas-collecting tubes 41. The gas-collecting tubes 41, like the water-supply tubes, extend through the top 37 of the outer chamber 15 and are sealed at apertures 40 with seals 39. Additional apertures 43 are provided in the top 37 of the outer chamber in order that supplemental water supply lines (not shown) may be installed. If the supplemental water supply lines are not installed, these additional apertures 43, are plugged.

The gas line 23 separates into individual gas lines 45 leading to tanks 19. These tanks 19 are gas storage tanks, preferably containing porous material and are filled with acetone in order to absorb a maximum quantity of acetylene gas in a safe manner. In order to facilitate such storage, it is possible to provide valves (not shown) which prevent backflow of acetylene gas from the gas storage tanks 19 to the gas-collecting manifold 27. Regardless, a check valve 47 is installed in the gas line 23, also in order to prevent such backflow.

Figure 1B:
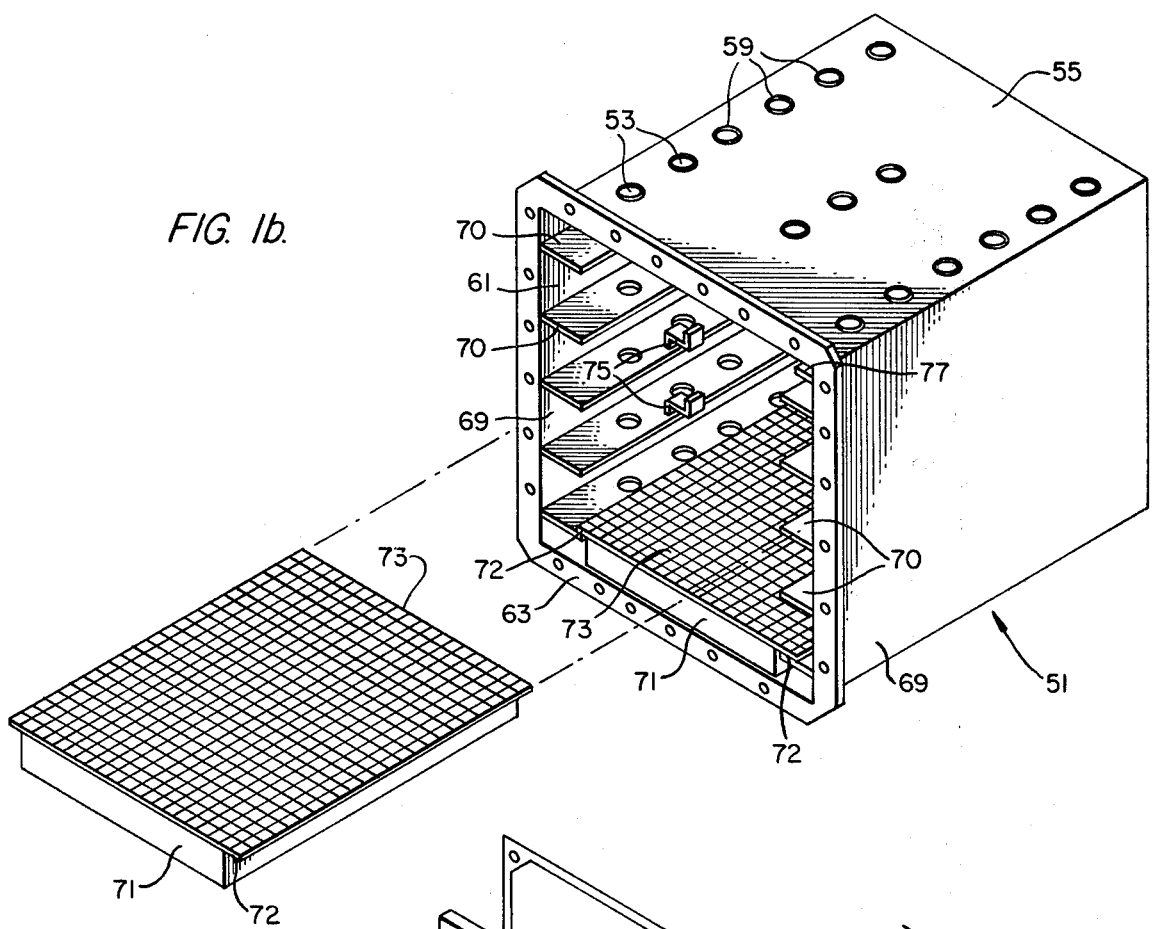

FIG. 1b shows an inner chamber 51 which serves as a gas-generating chamber. A plurality of apertures 53 are provided on a top surface 55 of the inner chamber 51. These apertures 53 are located so as to align with apertures 40. Apertures 53 are also provided with seals 59. The inner chamber 51 has a front opening 61, having a flange 63, which aligns with a front opening 65 on the outer chamber 15. A mating flange 67 is a part of the outer chamber 15 and mates with the inner chamber's flange 63. The inner chamber 51 is secured within the outer chamber 15 at the flanges 63, 67, using a gasket (not shown) in order to seal the inner and outer chambers 51, 15 at the flanges 63, 67. The space between the inner and outer chambers 51, 15 forms a cooling chamber into which coolant fluid may circulate. This helps keep the inner chamber 51 from overheating. The seals 39, 59 on the outer and inner chambers 15, 51, respectively, and the gasket at the flanges 63, 67, prevent the escape of cooling fluid.

The inner chamber 51 has mounted to at least two side walls 69 a plurality of shelf brackets 70, with the shelf brackets 70 being inside of the inner chamber 51. The shelf brackets 70 can support a plurality of trays 71 which support calcium carbide ($CaC_2$) material (not shown) and dry or wet calcium hydroxide ($Ca(OH)_2$). The calcium carbide may be in the form of briquettes or in powder form. The trays 71 have flanges 72 thereon so that they may be supported on the shelf brackets 70 in such a way that they (the trays 71) can be quickly removed and replaced through the front opening 61. Supported above each tray 71 is a grid 73, which is one of a plurality of grids 73 formed of criss-crossed metal. Each grid 73 causes water supplied at any portion of the grid 73 to disperse along the grid. The criss-crossed construction of the grids 73 also permits fluid to pass therethrough. This primarily includes gaseous fluid, but may also include liquid fluid such as water. It is important that the grids 73 be designed to cause water to pass across the grids 73, as well as to be able to allow fluids to pass therethrough. This arrangement permits a rapid uniform dispersion of water throughout the charge of calcium carbide, while permitting the inner chamber 51 to be rather densely filled with calcium carbide material.

The grids 73 are supported by the shelf brackets 70 and trays 71 in the inner chamber horizontally. In order to prevent the grids 73 from shifting excessively on the trays 71 and thereby becoming dislocated, additional supports 75 are provided. The additional supports 75 also serve to confine the trays 71.

As mentioned previously, the water supply tubes 35 and the gas-collecting tubes 41 pass through apertures 40 in order to pass into the inner chamber 51. Apertures 53 on top surface 55, being aligned with apertures 40 permit the tubes 35, 43 to enter the inner chamber 51. The water supply tubes 35 may extend to different levels in order to supply water to different grids 73 and trays 71. On the other hand, the gas-collecting tubes 41 need only extend to the top of the inner chamber 51, where advantageously, they do not collect calcium hydroxide. A gas separation trough 77 may be placed below the gas-collection tubes.

Figure 1C:
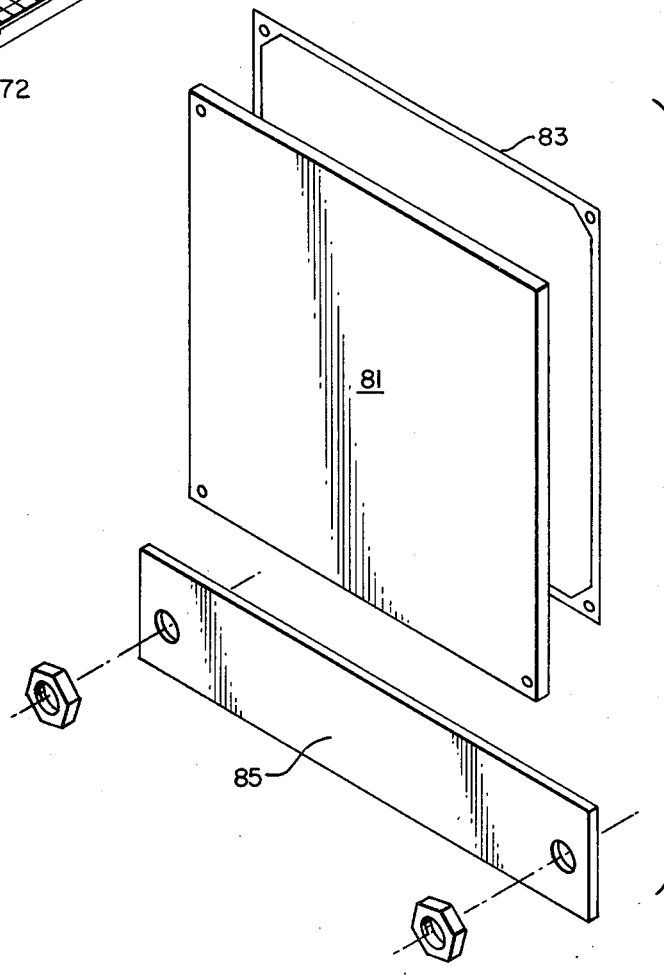
FIG. 1c shows a door assembly for the gas generator according to the invention.

A front door 81 shown in FIG. 1 is provided to seal against the front of the inner chamber 51. In order to removably seal the front door 81 with the inner chamber 51, an elastomeric gasket 83 of any appropriate design is provided for attachment to the front door 81 so as to mate with the inner chamber's flange 63. A latching means 85 is provided to latch the front door 81 against the inner chamber's flange 63.

When the inner chamber 51 is charged with calcium carbide and when water supply is provided, as in the water supply tanks 17, the apparatus may then generate acetylene. In order to reduce the possibility of an explosion, a purge line 88 is connected to the gas line 23, preferably upstream of the check valve 47. The purge line 88 is controlled by a manual or automatic purge valve 89 which allows gas to vent under a slight pressure differential until relatively pure acetylene gas, possibly mixed with water vapor is present.

A pressure relief valve 93 is also connected to the gas line 23 in order to avoid the possibility that gas pressure may exceed safe gas pressure for acetylene.

A gas control regulator 95 is connected to the gas line 23 preferably upstream of the check valve 47 in order to provide a control signal in response to the outlet pressure of the gas in the gas line 23. This signal is provided to the water pump 29 via a control switch (not shown). The water pump 29 preferably only permits water flow in the presence of a control signal, thus permitting gas control to be effective in response to pressure, as indicated by the signal originating from the gas control regulator 95. Alternatively, the water pump 29 may be of a type which provides only a specified pressure output.

A gas outlet 98 is connected to the gas line 23 via a check valve 99. The gas outlet 98 provides acetylene gas to and is therefore connected to a device which utilizes the gas.

Figure 2:
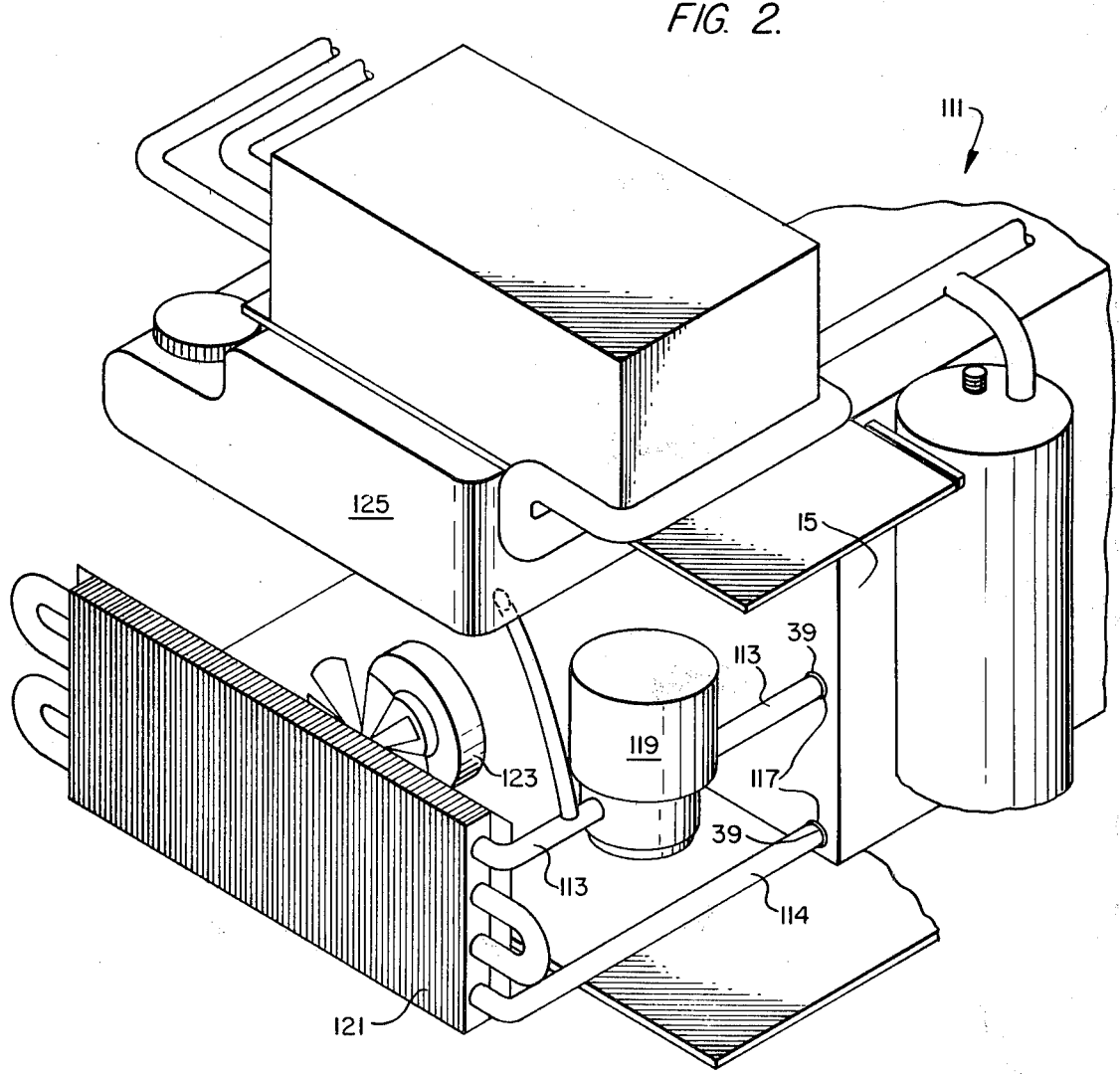
FIG. 2 shows a cooling system used with the gas generator of FIG. 1.

Referring to FIG. 2, the inner chamber 51 may be cooled by a liquid cooling system which includes the space between the outer and the inner chambers 15, 51 and a coolant recirculation system 111. The coolant recirculation system 111 includes a pair of coolant lines 113, 114 which lead to openings 117 in the outer chamber 15. A cooling water pump 119 pumps fluid through the lines 113, 114 and through a radiator 121. When necessary, a thermostatically-controlled fan 123 provides air circulation to cool the radiator 121. In order to reduce the necessary capacity of the radiator 121 and to reduce the use of the fan 123 during intermittent service, additional coolant is stored in an expansion tank 125.

In operation, the gas outlet 98 is connected to a device using acetylene gas such as a welding apparatus, a space heater, a water heater or an internal combustion engine. In order to explain controlled gas generation, the apparatus will be described as connected to an internal combustion engine as an auxiliary power supply. When the driver wants additional power, he activates the system by closing the control switch, via line 24 thus causing water pump 29 to pump water into the inner chamber 51 until enough gas is generated to cause the gas control regulator 95 to stop water pump 29 from pumping water. The gas outlet 98 is connected to a valve 22 which permits gas to be fed into the engine's air intake. This valve may be responsive to the driver's throttle and/or it may include an on-off valve which is activated under full throttle conditions. By providing the engine with a gas carburetor of the type used to supply a spark ignition engine with natural gas, it is possible to operate a spark ignition engine with either acetylene or another fuel, as well as to provide a boost in power when the vehicle is normally operating with a diverse fuel such as gasoline.

It is possible to use the pressure control system for operating a more simple device such as a water heater or space heater in which the actual output of the heater is controlled by an on-off valve or a simple flow control valve. In the case of a space heater, a conventional catalytic grid-type heater may be provided in order to provide heat without the necessity of storing gas. Thus, with the elimination of gas storage tanks 19, a gas heater may be used and transported at locations where gas storage is prohibited by regulation or for safety reasons. Furthermore, with such a system, the user may choose the amount of fuel that he wishes to store as, for example, when supplying a camping van or caravan with fuel for a particular camping trip. It is clear from the above description that several uses can be applied to the gas generator and modifications can be made to the preferred embodiment. For this reason, the invention should be read as limited only by the following claims:

What is claimed is:

1. A gas generating fuel cell capable of producing acetylene gas from calcium carbide comprising:
   (a) an inner housing having one open side, a flange on the exterior of the open side, a plurality of support brackets for supporting a plurality of grids in a horizontal position and a plurality of openings;
   (b) an outer housing having an open side into which the inner housing fits so as to meet with the outer housing with the open side of the inner housing aligning with the open side of the outer housing, a flange on the open side and a plurality of openings which align with the plurality of openings in the inner housing when the inner housing is nested in the outer housing;
   (c) a water supply means for providing pressurized water to the inner housing;
   (d) a gas recirculation means for allowing withdrawal of gas from the inner housing;

(e) a plurality of tubes which sealingly fit into said plurality of openings in the inner and outer housings, at least one of which tubes is connected to the water supply means to enable the water supply means to provide the pressurized water to the inner housing and at least another of which is connected to the gas recovery means to enable the gas recovery means to withdraw gas from the inner housing, the inner housing forming an inner chamber for the generation of gas;

(f) a water control means for controlling the amount of water supplied by the water supply means;

(g) a sealing means associated with the flange on the open side of the outer housing for permitting the inner housing to seal against the open side of the outer housing ;

(h) a door capable of sealing against the flange of the open side of the inner housing;

(i) a plurality of trays mountable in the fuel cell in a horizontal position on the support bracket, the trays offering support for a solid material such as $CaC_2$ and promoting exposure of the solid material to the water provided to the inner housing; and (j) a plurality of grids mountable in the fuel cell in a horizontal position and supported on the trays, the grids dispersing water to the solid material.

2. The apparatus of claim 1 wherein each grid comprises a series of criss-crossed metal strips which transfer the water horizontally across the inner chamber in order to enhance the evenness of distrubution of water over the solid material and allow passage of liquid downwardly therethrough and gas upwardly therethrough.

3. The apparatus of claim 1 further comprising a closed cooling system, defined by the space between the inner and outer housings, and a coolant recirculation system, wherein the liquid cooling absorbs heat within the outer chamber and gives off that heat through cooling radiators and the closed cooling further comprises a pump for pumping the liquid coolant.

4. The apparatus of claim 1 further comprising at least one storage tank for storing acetylene gas produced by the apparatus.

5. The apparatus of claim 4 wherein the water supply means further comprises a water storage means and said water control means includes a water pump.

6. The apparatus of claim 1 wherein the water control means comprises a sensor for detecting gas pressure within the inner housing.

7. The apparatus of claim 6 wherein the sensor provides an output to a control switch which is used to control the volume of water supplied to the inner chamber.

8. The apparatus of claim 1 wherein the water control means includes a pump and a flow sensor responsive to the volume of gas generated by the apparatus and the flow sensor provides a signal which is used to control the pump.

9. The apparatus of claim 1, further comprising a supply means for providing the gas to an internal combustion engine and a control means for controlling the amount of gas generated in accordance with the requirements of the internal combustion engine.

10. The apparatus of claim 4, further comprising a supply means for providing the gas to an internal combustion engine and a control means for controlling the amount of gas generated in accordance with the requirements of the internal combustion engine.

11. The apparatus of claim 1, further comprising a means for providing the gas to an internal combustion engine operating on a diverse fuel in order to provide an increased power output from the internal combustion engine as needed.

12. The apparatus of claim 4, further comprising a means for providing the acetylene gas to an internal combustion engine normally operating on a diverse fuel in order to provide an increased power output from the internal combustion engine as needed.

13. The apparatus of claim 3 further comprising a heater which receives gas generated by the apparatus and combusts the gas in order to provide heat.

* * * * *